US012280948B2

(12) United States Patent
Velagapudi et al.

(10) Patent No.: US 12,280,948 B2
(45) Date of Patent: Apr. 22, 2025

(54) SYSTEMS AND METHODS FOR PROVIDING ORDER FULFILLMENT USING A SPIRAL TOWER SYSTEM

(71) Applicant: Berkshire Grey Operating Company, Inc., Bedford, MA (US)

(72) Inventors: Prasanna Velagapudi, Pittsburgh, PA (US); Joseph Romano, Arlington, MA (US); Christopher Geyer, Arlington, MA (US); Guoming Alex Long, Wexford, PA (US); Thomas Allen, Reading, MA (US); Christopher Buck, Stow, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 1012 days.

(21) Appl. No.: 17/193,380

(22) Filed: Mar. 5, 2021

(65) Prior Publication Data

US 2021/0276798 A1    Sep. 9, 2021

Related U.S. Application Data

(60) Provisional application No. 62/986,399, filed on Mar. 6, 2020.

(51) Int. Cl.
  *B65G 1/04* (2006.01)
  *B65G 1/137* (2006.01)
  (Continued)

(52) U.S. Cl.
  CPC ......... *B65G 1/0485* (2013.01); *B65G 1/1371* (2013.01); *B65G 21/18* (2013.01);
  (Continued)

(58) Field of Classification Search
  CPC .... B65G 1/0485; B65G 1/1371; B65G 21/18; B65G 41/005; B65G 47/57; B65G 47/64;
  (Continued)

(56) References Cited

U.S. PATENT DOCUMENTS

| 4,542,808 A | 9/1985 | Lloyd, Jr. et al. |
| 4,622,875 A | 11/1986 | Emery et al. |

(Continued)

FOREIGN PATENT DOCUMENTS

| CA | 3043018 A1 | 5/2018 |
| CA | 3057334 A1 | 9/2018 |

(Continued)

OTHER PUBLICATIONS

Annex to Form PCT/ISA/206, Communication Relating to the Results of the Partial International Search issued by the European Patent Office, as the International Searching Authority, in related International Application No. PCT/US2022/028047 on Sep. 22, 2022, 2 pages.

(Continued)

*Primary Examiner* — Jacob S. Scott
*Assistant Examiner* — Erin Morris
(74) *Attorney, Agent, or Firm* — Gesmer Updegrove LLP

(57) ABSTRACT

A storage, retrieval and processing system for processing objects is disclosed that includes a plurality of bins including objects to be distributed, the plurality of bins being provided on a conveyance system, a programmable motion device that includes an end effector for grasping and moving any of the objects, the programmable motion device being capable of reaching any of the objects within at least one of the plurality of bins in an input area of the conveyance system, a perception system for providing perception data regarding a selected object that is presented to the perception system by the programmable motion device, and a routing convey- (Continued)

ance system including a routing conveyor for receiving the selected object, and for moving the selected object in each of vertical and rotational directions toward a destination container responsive to the perception data.

28 Claims, 12 Drawing Sheets

(51) Int. Cl.
    *B65G 21/18*     (2006.01)
    *B65G 41/00*     (2006.01)
    *B65G 47/57*     (2006.01)
    *B65G 47/64*     (2006.01)

(52) U.S. Cl.
    CPC ............ *B65G 41/005* (2013.01); *B65G 47/57* (2013.01); *B65G 47/64* (2013.01); *B65G 2203/0208* (2013.01); *B65G 2203/04* (2013.01)

(58) Field of Classification Search
    CPC ........ B65G 2203/0208; B65G 2203/04; B65G 1/1378; B65G 2203/041; B65G 1/1376
    See application file for complete search history.

(56) References Cited

U.S. PATENT DOCUMENTS

| | | | |
|---|---|---|---|
| 4,678,390 A | 7/1987 | Bonneton et al. |
| 4,722,653 A | 2/1988 | Williams et al. |
| 4,815,582 A | 3/1989 | Canziani |
| 4,846,335 A | 7/1989 | Hartlepp |
| 4,895,242 A | 1/1990 | Michel |
| 5,190,162 A | 3/1993 | Harlepp |
| 5,271,703 A | 12/1993 | Lindqvist et al. |
| 5,595,263 A | 1/1997 | Pignataro |
| 5,647,473 A | 7/1997 | Miller et al. |
| 5,794,789 A | 8/1998 | Payson et al. |
| 5,875,434 A | 2/1999 | Matsuoka et al. |
| 6,006,946 A | 12/1999 | Williams et al. |
| 6,076,023 A | 6/2000 | Sato |
| 6,189,702 B1 | 2/2001 | Bonnet |
| 6,208,908 B1 | 3/2001 | Boyd et al. |
| 6,246,023 B1 | 6/2001 | Kugle |
| 6,377,867 B1 | 4/2002 | Bradley et al. |
| 6,505,093 B1 | 1/2003 | Thatcher et al. |
| 6,513,641 B1 | 2/2003 | Affaticati et al. |
| 6,688,459 B1 | 2/2004 | Bonham et al. |
| 6,705,528 B2 | 3/2004 | Good et al. |
| 6,762,382 B1 | 7/2004 | Danelski |
| 7,861,844 B2 | 1/2011 | Hayduchok et al. |
| 8,718,814 B1 | 5/2014 | Clark et al. |
| 8,776,694 B2 | 7/2014 | Rosenwinkel et al. |
| 8,798,784 B1 | 8/2014 | Clark et al. |
| 8,851,272 B1 | 10/2014 | Hill |
| 9,020,632 B2 | 4/2015 | Naylor |
| 9,272,845 B2 | 3/2016 | Honkanen et al. |
| 9,364,865 B2 | 6/2016 | Kim |
| 9,481,518 B2 | 11/2016 | Neiser |
| 9,694,977 B2 | 7/2017 | Aprea et al. |
| 9,937,532 B2 | 4/2018 | Wagner et al. |
| 9,975,148 B2 | 5/2018 | Zhu et al. |
| 10,007,827 B2 | 6/2018 | Wagner et al. |
| 10,029,865 B1 | 7/2018 | McCalib, Jr. et al. |
| 10,086,998 B1 | 10/2018 | Tilekar et al. |
| 10,438,034 B2 | 10/2019 | Wagner et al. |
| 10,518,974 B2 | 12/2019 | Lee et al. |
| 10,577,180 B1 | 3/2020 | Mehta et al. |
| 10,596,696 B2 | 3/2020 | Wagner et al. |
| 10,632,610 B2 | 4/2020 | Wagner et al. |
| 10,649,445 B2 | 5/2020 | Wagner et al. |
| 10,730,077 B2 | 8/2020 | Wagner et al. |
| 10,843,333 B2 | 11/2020 | Wagner et al. |
| 10,894,674 B2 | 1/2021 | Wagner et al. |
| 10,906,740 B2 | 2/2021 | Wagner et al. |
| 11,020,770 B1 | 6/2021 | Tilekar et al. | |
| 11,338,999 B2 * | 5/2022 | Hu | B65G 47/24 |
| 11,472,633 B2 | 10/2022 | Wagner et al. | |
| 2002/0091801 A1 | 7/2002 | Lewin et al. | |
| 2002/0179400 A1 | 12/2002 | Dersham et al. | |
| 2002/0179502 A1 | 12/2002 | Cerutti et al. | |
| 2005/0002762 A1 | 1/2005 | Gambarelli et al. | |
| 2006/0045672 A1 | 3/2006 | Maynard et al. | |
| 2008/0181753 A1 | 7/2008 | Bastian et al. | |
| 2009/0129902 A1 | 5/2009 | Schafer | |
| 2010/0036675 A1 | 2/2010 | Schäfer | |
| 2010/0096243 A1 * | 4/2010 | Balk | B65G 47/52 198/457.01 |
| 2010/0300842 A1 | 12/2010 | Bastian, II et al. | |
| 2010/0316469 A1 | 12/2010 | Lert et al. | |
| 2011/0056806 A1 * | 3/2011 | Johnson | B65G 21/18 198/778 |
| 2011/0144798 A1 | 6/2011 | Freudelsperger | |
| 2011/0262253 A1 | 10/2011 | Krizmanic et al. | |
| 2012/0128454 A1 | 5/2012 | Hayduchok et al. | |
| 2012/0177465 A1 | 7/2012 | Koholka | |
| 2012/0328397 A1 | 12/2012 | Yamashita | |
| 2013/0051696 A1 | 2/2013 | Garrett et al. | |
| 2014/0031972 A1 | 1/2014 | DeWitt et al. | |
| 2014/0056672 A1 | 2/2014 | Mathys et al. | |
| 2014/0086714 A1 | 3/2014 | Malik | |
| 2014/0142746 A1 | 5/2014 | Vegh et al. | |
| 2014/0212257 A1 | 7/2014 | Yamashita | |
| 2014/0244026 A1 | 8/2014 | Neiser | |
| 2014/0277692 A1 | 9/2014 | Buzan et al. | |
| 2014/0277693 A1 | 9/2014 | Naylor | |
| 2014/0288696 A1 | 9/2014 | Lert | |
| 2015/0098775 A1 | 4/2015 | Razumov | |
| 2015/0294260 A1 | 10/2015 | Napoli | |
| 2016/0107848 A1 | 4/2016 | Baker | |
| 2016/0122135 A1 | 5/2016 | Bastian, II | |
| 2016/0221757 A1 | 8/2016 | DeWitt et al. | |
| 2016/0355337 A1 | 12/2016 | Lert et al. | |
| 2017/0015502 A1 | 1/2017 | Engel et al. | |
| 2017/0043953 A1 | 2/2017 | Battles et al. | |
| 2017/0057756 A1 | 3/2017 | Dugat et al. | |
| 2017/0136632 A1 | 5/2017 | Wagner et al. | |
| 2017/0267452 A1 | 9/2017 | Goren et al. | |
| 2017/0330135 A1 | 11/2017 | Taylor et al. | |
| 2017/0349385 A1 | 12/2017 | Maroni et al. | |
| 2018/0037410 A1 | 2/2018 | DeWitt | |
| 2018/0057264 A1 | 3/2018 | Wicks et al. | |
| 2018/0075402 A1 | 3/2018 | Stadie et al. | |
| 2018/0085788 A1 | 3/2018 | Engel | |
| 2018/0105363 A1 * | 4/2018 | Lisso | B65G 11/063 |
| 2018/0208397 A1 | 7/2018 | Schack et al. | |
| 2018/0251302 A1 | 9/2018 | Valinsky et al. | |
| 2018/0265311 A1 | 9/2018 | Wagner et al. | |
| 2018/0273296 A1 | 9/2018 | Wagner et al. | |
| 2018/0273298 A1 | 9/2018 | Wagner et al. | |
| 2018/0282066 A1 | 10/2018 | Wagner et al. | |
| 2018/0290830 A1 | 10/2018 | Valinsky et al. | |
| 2018/0327198 A1 | 11/2018 | Wagner et al. | |
| 2018/0354719 A1 | 12/2018 | Hoffman | |
| 2019/0218033 A1 | 7/2019 | Muttathil et al. | |
| 2019/0329979 A1 | 10/2019 | Wicks et al. | |
| 2020/0005005 A1 | 1/2020 | Wagner et al. | |
| 2020/0016746 A1 | 1/2020 | Yap et al. | |
| 2020/0039745 A1 | 2/2020 | Khodl et al. | |
| 2020/0152259 A1 | 5/2020 | DeWitt et al. | |
| 2020/0265380 A1 | 8/2020 | Dubois et al. | |
| 2020/0302390 A1 | 9/2020 | Elazary et al. | |
| 2020/0407178 A1 | 12/2020 | Battles et al. | |
| 2021/0039140 A1 | 2/2021 | Geyer et al. | |
| 2021/0039881 A1 | 2/2021 | Zhu et al. | |
| 2021/0039887 A1 | 2/2021 | Zhu et al. | |
| 2021/0047117 A1 | 2/2021 | Stevens et al. | |
| 2021/0047118 A1 | 2/2021 | Stevens et al. | |
| 2021/0178826 A1 | 6/2021 | Lutz et al. | |
| 2021/0276796 A1 | 9/2021 | Long | |
| 2021/0276797 A1 | 9/2021 | Velagapudi et al. | |
| 2021/0276799 A1 | 9/2021 | Velagapudi et al. | |
| 2022/0234825 A1 | 7/2022 | Krishnamoorthy et al. | |
| 2022/0284393 A1 | 9/2022 | Ai et al. | |

(56) References Cited

U.S. PATENT DOCUMENTS

| | | | |
|---|---|---|---|
| 2022/0356017 A1 | 11/2022 | Romano et al. | |
| 2023/0077893 A1 | 3/2023 | Gebhardt et al. | |
| 2023/0112778 A1 | 4/2023 | O'Hern et al. | |
| 2023/0119061 A1 | 4/2023 | Halamka et al. | |
| 2023/0137545 A1 | 5/2023 | Austrheim | |
| 2023/0150770 A1 | 5/2023 | Sebastian | |
| 2023/0219767 A1 | 7/2023 | Demir et al. | |
| 2023/0249914 A1 | 8/2023 | Fosnight et al. | |
| 2023/0271785 A1 | 8/2023 | Gravelle et al. | |
| 2023/0331475 A1 | 10/2023 | Yamashita | |

FOREIGN PATENT DOCUMENTS

| | | | |
|---|---|---|---|
| CN | 102001506 A | 4/2011 | |
| CN | 102264602 A | 11/2011 | |
| CN | 103332426 A | 10/2013 | |
| CN | 104169196 A | 11/2014 | |
| CN | 104859990 A | 8/2015 | |
| CN | 104925440 A | 9/2015 | |
| CN | 205257168 U | 5/2016 | |
| CN | 105858042 A | 8/2016 | |
| CN | 205820147 U | 12/2016 | |
| CN | 104495181 B | 2/2017 | |
| CN | 206456846 U | 9/2017 | |
| CN | 107635896 A | 1/2018 | |
| CN | 107720072 A | 2/2018 | |
| CN | 108146948 A | 6/2018 | |
| CN | 108700869 A | 10/2018 | |
| CN | 109081027 A | 12/2018 | |
| CN | 110062740 A | 7/2019 | |
| CN | 110325462 A | 10/2019 | |
| CN | 209506761 U | 10/2019 | |
| CN | 110431097 A | 11/2019 | |
| CN | 110461734 A | 11/2019 | |
| CN | 110462657 A | 11/2019 | |
| CN | 209720654 U | 12/2019 | |
| CN | 110662707 A | 1/2020 | |
| CN | 110691742 A | 1/2020 | |
| CN | 110740954 A | 1/2020 | |
| CN | 110803439 A | 2/2020 | |
| CN | 115210152 A | 10/2022 | |
| CN | 115243987 A | 10/2022 | |
| CN | 115243988 A | 10/2022 | |
| CN | 117255718 A | 12/2023 | |
| CN | 118139798 A | 6/2024 | |
| DE | 102004014378 A1 | 10/2005 | |
| DE | 102008046325 A1 * | 3/2010 | ........... B65G 1/1376 |
| EP | 1151942 A2 | 11/2001 | |
| EP | 2818433 A1 | 12/2014 | |
| EP | 3354598 A1 | 8/2018 | |
| EP | 3572355 A1 | 11/2019 | |
| EP | 4114766 A2 | 1/2023 | |
| EP | 4114767 A1 | 1/2023 | |
| EP | 4114768 A1 | 1/2023 | |
| EP | 4114769 A1 | 1/2023 | |
| EP | 4334045 A2 | 3/2024 | |
| TW | 201300298 A | 1/2013 | |
| WO | 2007009136 A1 | 1/2007 | |
| WO | 2009089159 A2 | 7/2009 | |
| WO | WO-2010040809 A1 * | 4/2010 | ........ A61M 15/0011 |
| WO | WO-2011012611 A1 * | 2/2011 | ........... B65G 17/086 |
| WO | 2014080041 A | 11/2011 | |
| WO | 2012106744 A1 | 8/2012 | |
| WO | WO-2016105201 A2 * | 6/2016 | ............. B65G 17/08 |
| WO | 2017123678 A1 | 7/2017 | |
| WO | 2018175466 A1 | 9/2018 | |
| WO | 2021026359 A1 | 2/2021 | |
| WO | 2021178819 A1 | 9/2021 | |
| WO | 2021178830 A1 | 9/2021 | |
| WO | 2022236038 A2 | 11/2022 | |
| WO | 2023064465 A1 | 4/2023 | |

OTHER PUBLICATIONS

Communication pursuant to Rules 161(1) and 162 EPC issued by the European Patent Office in related European Patent Application No. 21714592.9 on Oct. 13, 2022, 3 pages.

Communication pursuant to Rules 161(1) and 162 EPC issued by the European Patent Office in related European Patent Application No. 21714588.7 on Oct. 13, 2022, 3 pages.

Communication pursuant to Rules 161(1) and 162 EPC issued by the European Patent Office in related European Patent Application No. 21714590.3 on Oct. 13, 2022, 3 pages.

Communication pursuant to Rules 161(1) and 162 EPC issued by the European Patent Office in related European Patent Application No. 21715372.5 on Oct. 13, 2022, 3 pages.

International Search Report and the Written Opinion of the International Searching Authority, or the Declaration, and the International Search Report and Written Opinion of the International Searching Authority (the European Patent Office) issued in related International Application No. PCT/US2022/028047 on Nov. 14, 2022, 20 pages.

Notice of First Office Action, along with its English translation, issued by the China National Intellectual Property Office in related Chinese Patent Application No. 202180018333.5 on Mar. 31, 2023, 32 pages.

Notice of First Office Action, along with its English translation, issued by the China National Intellectual Property Office in related Chinese Patent Application No. 202180018436.1 on Mar. 31, 2023, 17 pages.

Notice on the First Office Action, along with its English translation, issued by the China National Intellectual Property Administration, in related Chinese Patent Application No. 202180018364.0 on Mar. 30, 2023, 23 pages.

Notice on the First Office Action, along with its English translation, issued by the China National Intellectual Property Administration, in related Chinese Patent Application No. 202180018310.4 on Mar. 30, 2023, 21 pages.

International Search Report and Written Opinion of the International Searching Authority, the European Patent Office, issued in related International Application No. PCT/US2022/046561 on Feb. 13, 2023, 13 pages.

International Search Report and Written Opinion of the International Searching Authority issued by the European Patent Office in related International Application No. PCT/US2021/021133 on Jun. 21, 2021, 11 pages.

Annex to Form PCT/ISA/206, Communication Relating to the Results of the Partial International Search and Provisional Opinion Accompanying the Partial Search Result issued by the International Searching Authority, the European Patent Office, in related International Application No. PCT/US2021/021140 on Jul. 6, 2021, 2 pages.

International Preliminary Report on Patentability issued by the International Bureau of WIPO in related International Application No. PCT/US2021/021118 on Sep. 6, 2022, 9 pages.

International Preliminary Report on Patentability issued by the International Bureau of WIPO in related International Application No. PCT/US2021/021133 on Sep. 6, 2022, 7 pages.

International Preliminary Report on Patentability issued by the International Bureau of WIPO in related International Application No. PCT/US2021/021140 on Sep. 15, 2022, 10 pages.

International Preliminary Report on Patentability issued by the International Bureau of WIPO in related International Application No. PCT/US2021/021128 on Sep. 6, 2022, 8 pages.

International Search Report and Written Opinion issued by the International Searching Authority (the European Patent Office) in related International Application No. PCT/US2021/021140 on Sep. 3, 2021, 16 pages.

International Search Report and Written Opinion issued by the International Searching Authority (the European Patent Office) in related International Application No. PCT/US2021/021128 on Jun. 21, 2021, 12 pages.

(56) References Cited

OTHER PUBLICATIONS

International Search Report and Written Opinion of the International Searching Authority, the European Patent Office, issued in related International Application No. PCT/US2021/021118 on Jul. 16, 2021, 12 pages.
Communication pursuant to Rules 161(1) and 162 EPC issued by the European Patent Office in related European Patent Application No. 22727547.6 on Dec. 14, 2023, 3 pages.
Examiner's Report issued by the Innovation, Science and Economic Development Canada (Canadian Intellectual Property Office) in related Canadian Patent Application No. 3,174,544 on Nov. 6, 2023, 4 pages.
Examiner's Report issued by the Innovation, Science and Economic Development Canada (Canadian Intellectual Property Office) in related Canadian Patent Application No. 3,174,546 on Nov. 7, 2023, 4 pages.
Examiner's Report issued by the Innovation, Science and Economic Development Canada (Canadian Intellectual Property Office) in related Canadian Patent Application No. 3,174,543 on Nov. 6, 2023, 4 pages.
Examiner's Report issued by the Innovation, Science and Economic Development Canada (Canadian Intellectual Property Office) in related Canadian Patent Application No. 3,174,552 on Nov. 29, 2023, 6 pages.
International Preliminary Report on Patentability issued by the International Bureau of WIPO in related International application No. PCT/US2022/028047 on Oct. 24, 2023, 14 pages.
Non-Final Office Action issued by the United States Patent and Trademark Office in related U.S. Appl. No. 17/193,378, on Aug. 4, 2023, 26 pages.
Notice on the Second Office Action, along with its English translation, issued by the China National Intellectual Property Administration in related Chinese Patent Application No. 202180018310.4 on Oct. 11, 2023, 24 pages.
Notice on the Second Office Action, along with its English translation, issued by the China National Intellectual Property Administration in related Chinese Patent Application No. 202180018333.5 on Oct. 12, 2023, 35 pages.
Notice on the Second Office Action, along with its English translation, issued by the China National Intellectual Property Administration in related Chinese Patent Application No. 202180018364.0 on Oct. 11, 2023, 19 pages.
Chinese Thesis of Zhang et al., Warehouse Management Practices, Aviation Industry Press, Jan. 2012, pp. 56-59, 15 pages including the English translation prepared by Shanghai Patent & Trademark Law Office, LLC.
Communication pursuant to Rules 161(1) and 162 EPC issued by the European Patent Office in related European Patent Application No. 22809552.7 on May 22, 2024, 3 pages.
International Preliminary Report on Patentability issued by the International Bureau of WIPO in related international application No. PCT/US2022/046561 on Apr. 16, 2024, 7 pages.
Non-Final Office Action issued by the United States Patent and Trademark Office in related U.S. Appl. No. 17/193,377 on Mar. 21, 2024, 44 pages.
Non-Final Office Action issued by the United States Patent and Trademark Office in related U.S. Appl. No. 17/193,384 on Apr. 5, 2024, 38 pages.
Notice of Third Office Action, along with its English translation, issued by the China National Intellectual Property Administration in related Chinese Patent Application No. 202180018310.4 on Apr. 17, 22 pages.
Notice of Third Office Action, along with its English translation, issued by the China National Intellectual Property Administration in related Chinese Patent Application No. 202180018333.5 on Apr. 17, 31 pages.
Notice of Third Office Action, along with its English translation, issued by the China National Intellectual Property Administration in related Chinese Patent Application No. 202180018364.0 on Apr. 17, 2024, 24 pages.

\* cited by examiner

SYSTEMS AND METHODS FOR PROVIDING ORDER FULFILLMENT USING A SPIRAL TOWER SYSTEM

PRIORITY

The present application claims priority to U.S. Provisional Patent Application No. 62/986,399 filed Mar. 6, 2020, the disclosure of which is hereby incorporated by reference in its entirety.

BACKGROUND

The present invention relates to order fulfillment systems, and relates in particular to systems for providing aggregation of objects (e.g., products, packages, bags, items, goods, etc.) for preparation for shipment to destination locations, such as in Automated Storage and Retrieval Systems.

Order fulfillment systems typically involve the processing of a wide variety of objects for distribution to a large number of distribution locations, such as intermediate distribution stations, mail order stations, geographic group locations and address specific locations. Automated storage and retrieval systems (AS/RS) generally include computer controlled systems of automatically storing (placing) and retrieving items from defined storage locations. Traditional AS/RS typically employ totes (or bins), which are the smallest unit of load for the system. In these systems, the totes are brought to people who pick individual items out of the totes. When a person has picked the required number of items out of the tote, the tote is then re-inducted back into the AS/RS.

In these traditional systems, the totes are brought to a person, and the person may either remove an item from the tote or add an item to the tote. The tote is then returned to the storage location. Such systems, for example, may be used in libraries and warehouse storage facilities. The AS/RS involves no processing of the items in the tote, as a person processes the objects when the tote is brought to the person. This separation of jobs allows any automated transport system to do what it is good at—moving totes—and the person to do what the person is better at—picking items out of cluttered totes. It also means the person may stand in one place while the transport system brings the person totes, which increases the rate at which the person can pick goods.

There are limits however, on such conventional systems in terms of the time and resources required to move totes toward and then away from each person, as well as how quickly a person can process totes in this fashion in applications where each person may be required to process a large number of totes. There remains a need therefore, for an AS/RS that stores and retrieves objects more efficiently and cost effectively, yet also assists in the processing of a wide variety of objects.

SUMMARY

In accordance with an aspect, the invention provides a storage, retrieval and processing system for processing objects that includes a plurality of bins including objects to be distributed, the plurality of bins being provided on a conveyance system, a programmable motion device that includes an end effector for grasping and moving any of the objects, the programmable motion device being capable of reaching any of the objects within at least one of the plurality of bins in an input area of the conveyance system, a perception system for providing perception data regarding a selected object that is presented to the perception system by the programmable motion device, and a routing conveyance system including a routing conveyor for receiving the selected object, and for moving the selected object in each of vertical and rotational directions toward a destination container responsive to the perception data.

In accordance with another aspect, the invention provides a storage, retrieval and processing system for processing objects including a plurality of bins including objects to be distributed, the plurality of bins being provided on an input conveyance system, a programmable motion device that includes an end effector for grasping and moving any of the objects, the programmable motion device being capable of reaching any of the objects within at least one of the plurality of bins in an input area of the input conveyance system, and a routing conveyance system including a conveyor for receiving the selected object, and for moving the selected object from the input area toward a destination container provided at mutually-helically disposed destination container locations.

In accordance with a further aspect, the invention provides a method of providing storage, retrieval and processing of objects. The method includes providing on a conveyance system a plurality of bins including objects to be distributed, grasping and moving objects within at least one of the plurality of bins in an input area of the conveyance system using a programmable motion device that includes an end effector for grasping and moving any of the objects, providing perception data regarding a selected object that is presented to the perception system by the programmable motion device, and routing the selected object in a vertical direction toward a destination container responsive to the perception data, said destination container being provided among a plurality of destination containers at mutually-helically disposed destination container locations, and the vertical direction being generally internal to the mutually-helically disposed destination container locations.

BRIEF DESCRIPTION OF THE DRAWINGS

The following description may be further understood with reference to the accompanying drawings in which.

Figure 1:
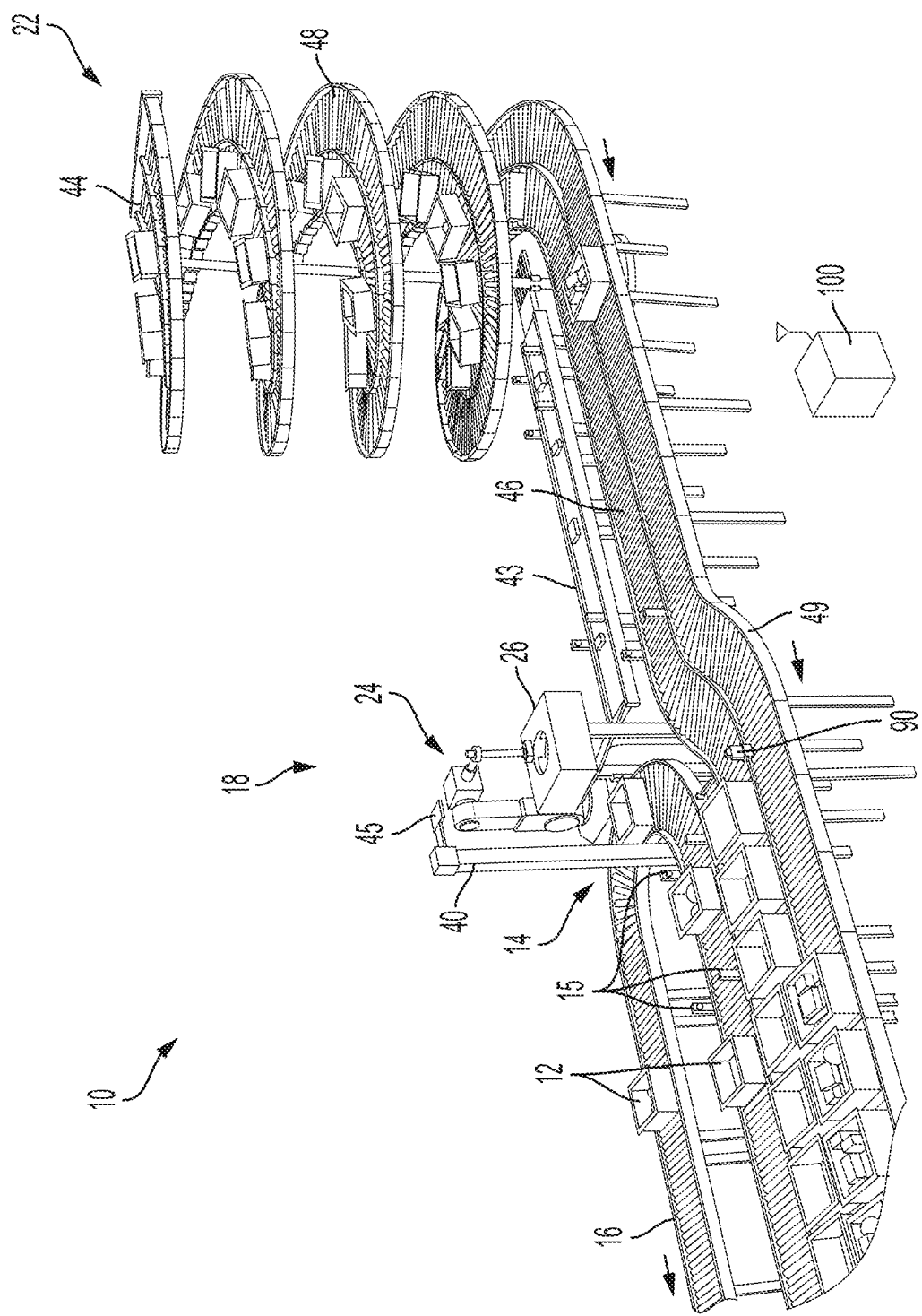
FIG. 1 shows an illustrative diagrammatic front isometric view of a storage, retrieval and processing system in accordance with an aspect of the present invention.

The drawings are shown for illustrative purposes only.

DETAILED DESCRIPTION

In accordance with an aspect, the invention provides an ASRS system 10 in which objects are provided in a plurality of bins 12 at an input area 14 of an input conveyance system 16. Objects are processed at a processing station 18, then routed via an object in-feed conveyor 43 to a routing conveyance system 20 (shown in more detail in FIGS. 2 and 8) to any of a plurality of destination containers at a destination area 22. The processing station 18 may include a programmable motion device 24, a bin perception unit 45 (e.g., mounted to a stand 40), and an object perception unit 26. Generally, objects are provided to the input area 14 in bins 12, are moved by a programmable motion device 24 to an object perception unit 26, fall to the object in-feed conveyor 43, and are routed to any of a plurality of destination containers that are provided in mutually-helically disposed destination locations (e.g., on a helical destination location conveyor 44). The helical destination location conveyor 44 is in communication with an empty container supply conveyor 46. Paired next to the helical destination location conveyor 44 is a helically-shaped output conveyor 48 that is in communication with an output conveyor 49.

Figure 2:
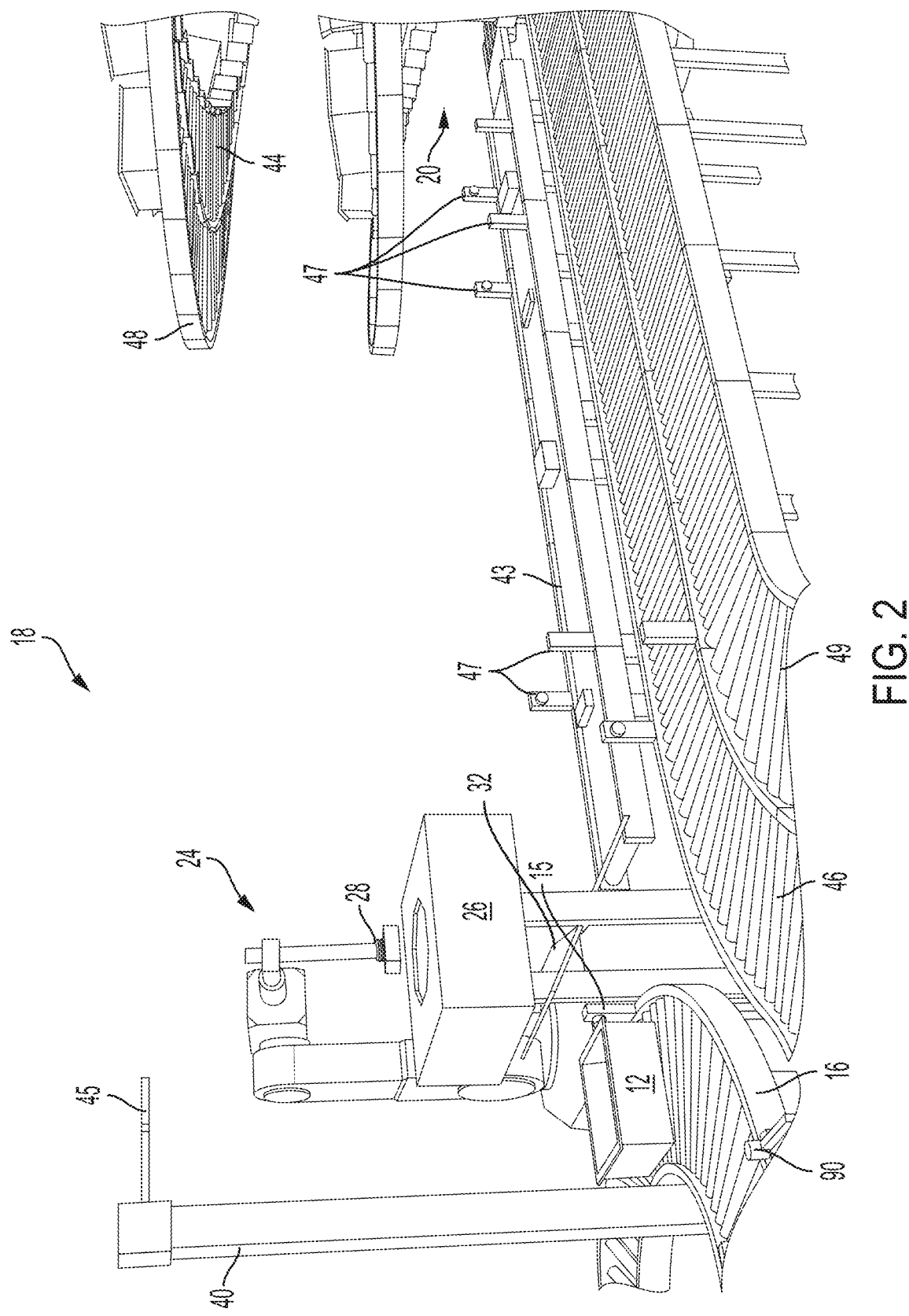
FIG. 2 shows an illustrative diagrammatic enlarged view of an intake portion of the system of FIG. 1.

Empty containers are provided from the empty container supply conveyor 46, and are moved upward into the helical destination location conveyor 44. Completed containers are removed from the conveyor 44 and pushed onto the adjacent helically-shaped output conveyor 48 which leads to the output conveyors 49. With reference to FIG. 2, the input conveyor 16 may include a plurality of detectors 15 that monitor movement of the conveyors, and may confirm the identity and positon of a conveyor at the input area 14 for processing at the processing station 18.

The operations of the system are coordinated with a central control system 100 as shown in FIG. 1 that communicates wirelessly with each of the conveyors and conveyor sensors, the programmable motion device 24, the perception units 45, 26, as well as all elements of the routing conveyance system, container arrays, container movement systems, and output conveyance systems (all components and systems). The bin perception unit 45 aids in grasping objects from the bins 12 with an end effector of the programmable motion device. Once grasped by the programmable motion device, the object is dropped into the object perception unit 26, and the system thereby determines from symbol strings the UPC associated with the object, as well as the outbound destination for each object. The central control system 100 is comprised of one or more workstations or central processing units (CPUs). For example, the correspondence between UPCs or mailing labels, and outbound destinations is maintained by a central control system in a database called a manifest. The central control system maintains the manifest by communicating with a warehouse management system (WMS). The manifest provides the outbound destination for each in-bound object.

Figure 3:
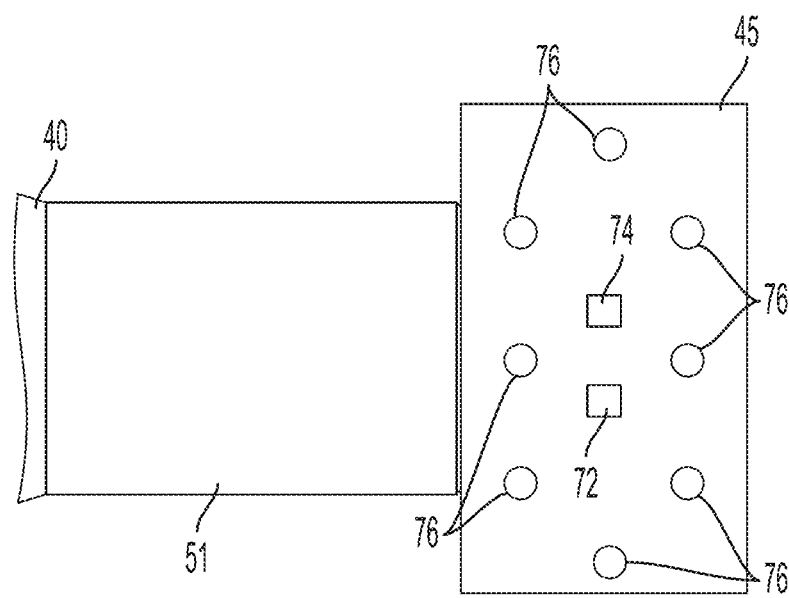
FIG. 3 shows an illustrative diagrammatic underside view of the bin perception unit of FIGS. 1 and 2.

In particular, the system of an aspect includes a bin perception unit 45 that is mounted above a bin of objects to be processed next to the articulated arm 24, looking down into a bin 12. The bin perception unit 45, for example and as shown in FIG. 3, may be attached via a mount 51 to a perception unit stand 40, and may include (on the underside thereof), a camera 72, a depth sensor 74 and lights 76. A combination of 2D and 3D (depth) data is acquired. The depth sensor 74 may provide depth information that may be used together with the camera image data to determine depth information regarding the various objects in view. The lights 76 may be used to remove shadows and to facilitate the identification of edges of objects, and may be all on during use, or may be illuminated in accordance with a desired sequence to assist in object identification. The system uses this imagery and a variety of algorithms to generate a set of candidate grasp locations for the objects in the bin as discussed in more detail below.

Figure 4:
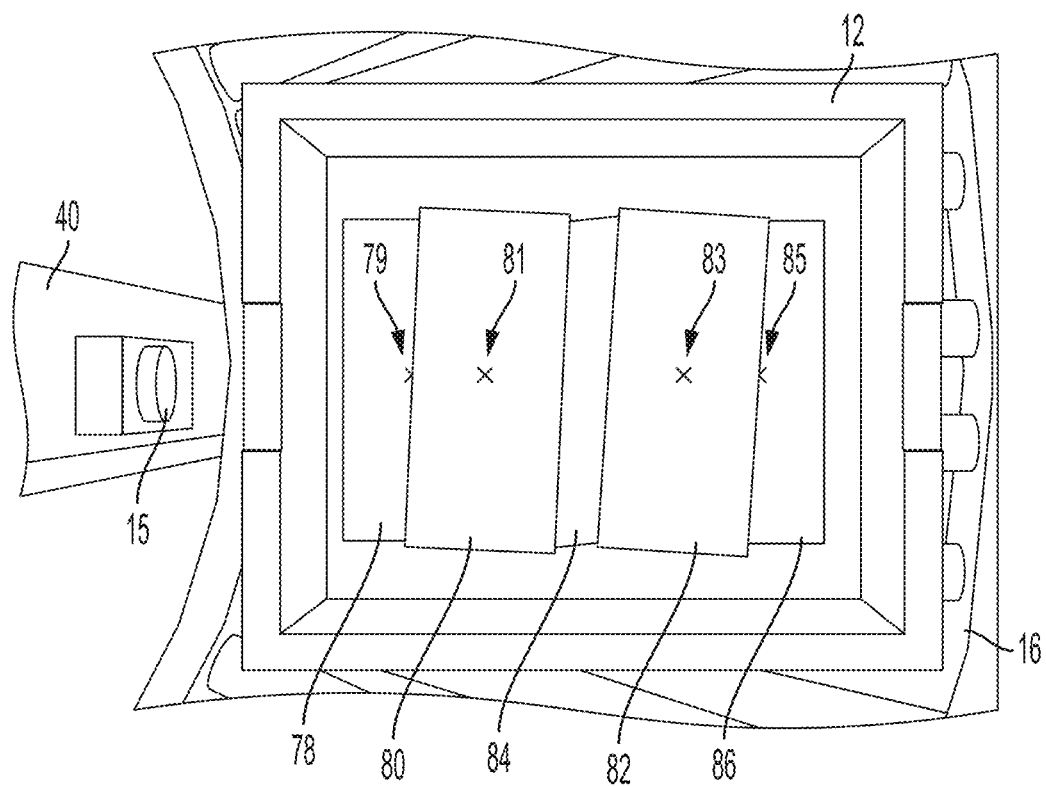
FIG. 4 shows an illustrative diagrammatic view from the bin perception unit of FIG. 3 directed a bin and its contents.

FIG. 4 shows an image view from the bin perception unit 45. The image view shows a bin 12 in the input area 14 (a conveyor), and the bin 12 contains objects 78, 80, 82, 84 and 86. In the present embodiment, the objects are homogenous, and are intended for distribution to different break-pack packages. Superimposed on the objects 78, 80, 82, 84, 86 (for illustrative purposes) are anticipated grasp locations 79, 81, 83 and 85 of the objects. Note that while candidate grasp locations 79, 83 and 85 appear to be good grasp locations, grasp locations 79, 85 do not because each associated object is at least partially underneath another object. The system may also not even try to yet identify a grasp location for the object 84 because the object 84 is too obscured by other objects. Candidate grasp locations may be indicated using a 3D model of the robot end effector placed in the location where the actual end effector would go to use as a grasp location. Grasp locations may be considered good, for example, if they are close to the center of mass of the object to provide greater stability during grasp and transport, and/or if they avoid places on an object such as caps, seams, etc. where a good vacuum seal might not be available.

Figure 5:
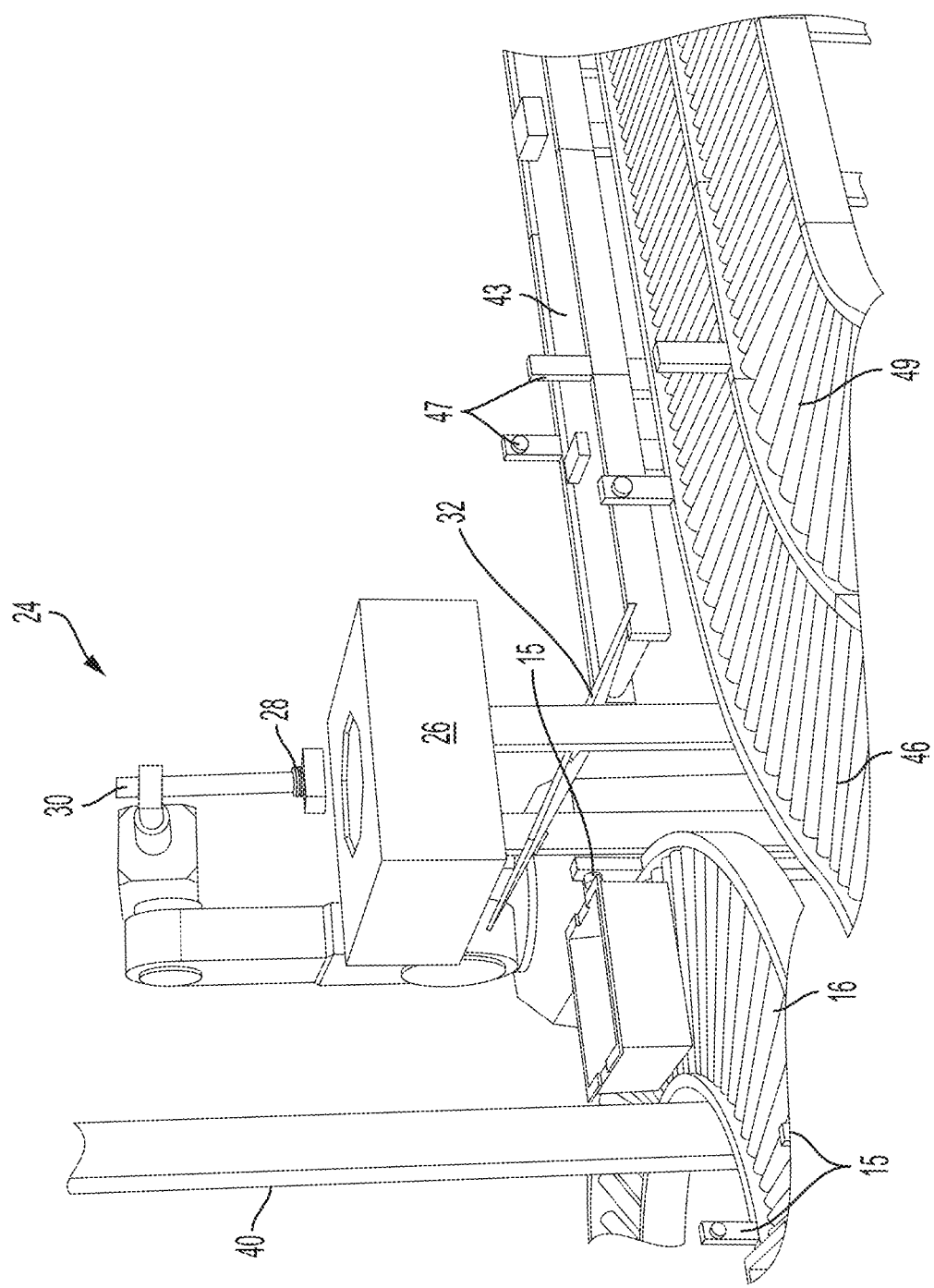
FIG. 5 shows an illustrative diagrammatic enlarged view of the object perception unit of the system of FIG. 1.
Figure 6:
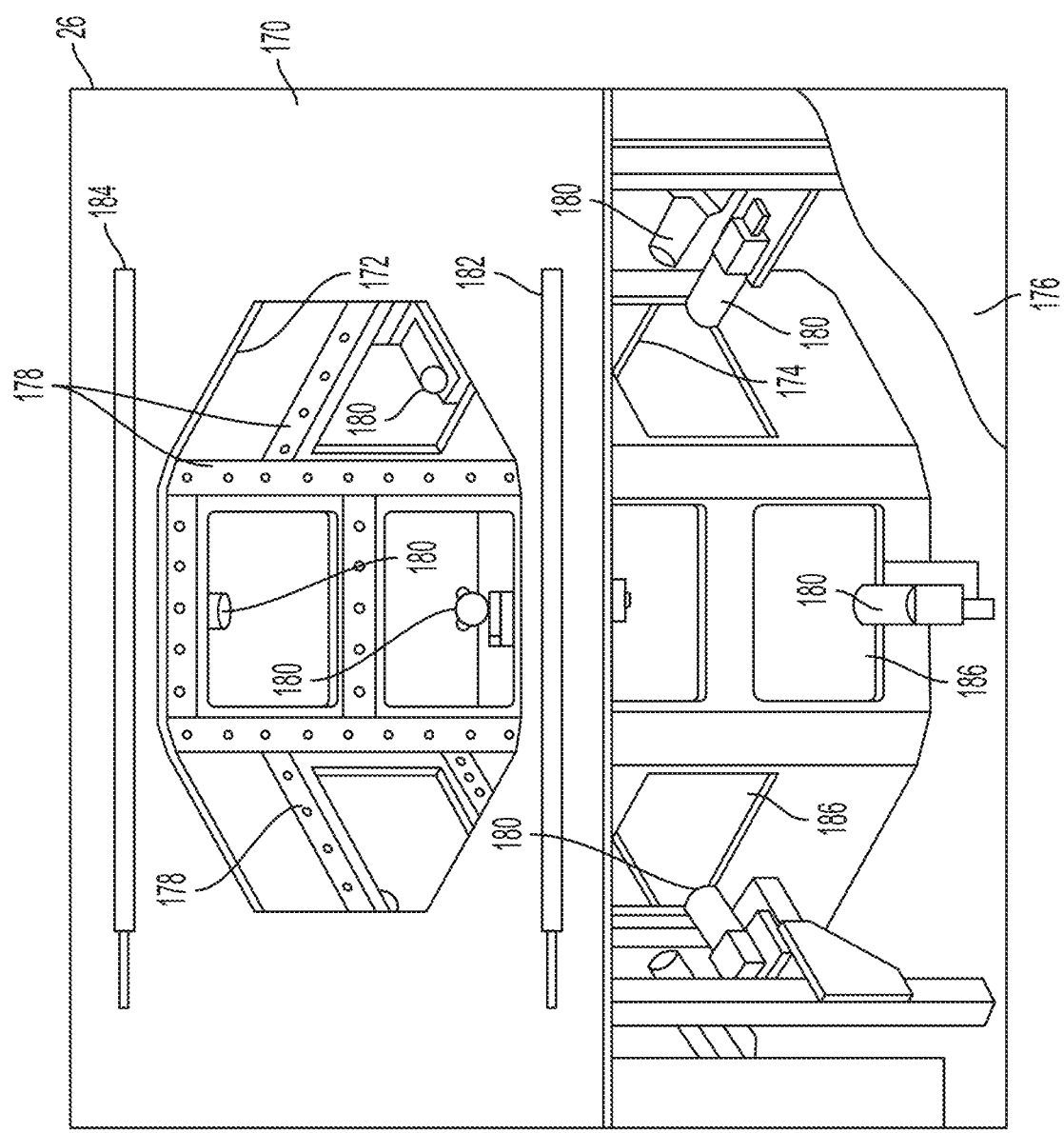
FIG. 6 shows an illustrative diagrammatic front elevated view of the object perception unit of FIGS. 1 and 5.
Figure 7:
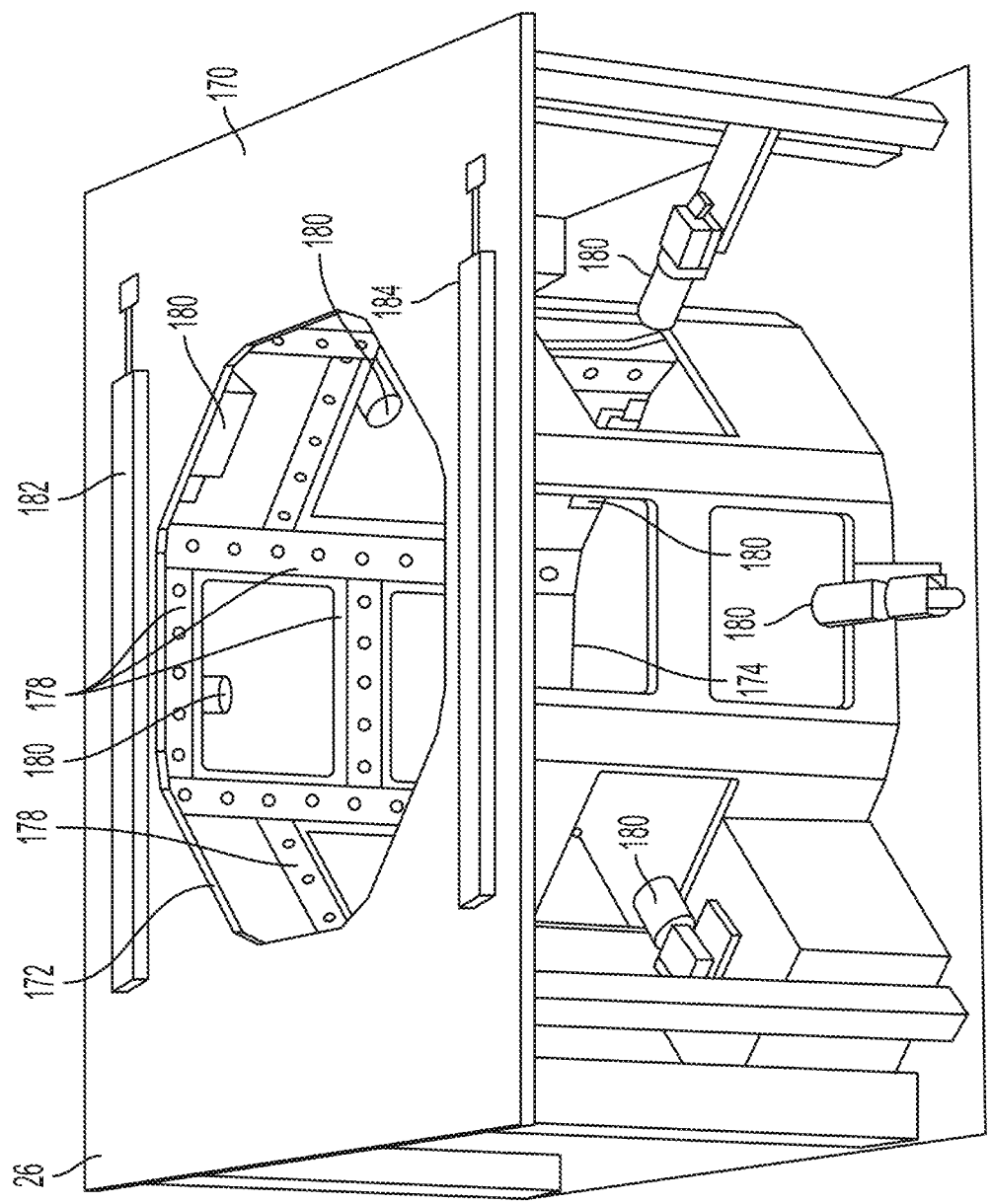
FIG. 7 shows an illustrative diagrammatic rear elevated view of the object perception unit of FIGS. 1 and 5.

With reference to FIG. 5, the programmable motion device 24 includes an end effector 28 that is coupled via a hose mount 30 to a vacuum hose attached to a vacuum source. With further reference to FIGS. 6 and 7, the object perception unit 26 includes a structure 170 having a top opening 172 and a bottom opening 174, and the walls may be covered by an enclosing material 176 (e.g., a colored covering such as orange plastic, to protect humans from potentially dangerously bright lights within the object perception unit 26) as shown in FIGS. 5 and 6. The structure 170 includes a plurality of rows of sources (e.g., illumination sources such as LEDs) 178 as well as a plurality of image perception units (e.g., cameras) 180. The sources 178 are provided in rows, and each is directed toward the center of the opening. The perception units 180 are also generally directed toward the opening, although some cameras are directed horizontally, while others are directed upward, and some are directed downward. The system also includes an entry source (e.g., infrared source) 182 as well as an entry detector (e.g., infrared detector) 184 for detecting when an object has entered the object perception unit 26. The LEDs and cameras therefore encircle the inside of the structure 170, and the cameras are positioned to view the interior via windows that may include a glass or plastic covering (e.g., 186).

An important aspect of systems of certain embodiments of the present invention, is the ability to identify via barcode or other visual markings of objects, unique indicia associated with the object by employing an object perception unit 26 into which objects may be dropped. Automated scanning systems would be unable to see barcodes on objects that are presented in a way that their barcodes are not exposed or visible. The object perception unit 26 may be used in certain embodiments, with a robotic system that may include a robotic arm equipped with sensors and computing, that when combined is assumed herein to exhibit the following capabilities: (a) it is able to pick objects up from a specified class of objects, and separate them from a stream of heterogeneous objects, whether they are jumbled in a bin, or are singulated on a motorized or gravity conveyor system; (b) it is able to move the object to arbitrary places within its workspace; (c) it is able to place objects in an outgoing bin or shelf location in its workspace; and, (d) it is able to generate a map of objects that it is able to pick, represented as a candidate set of grasp points in the workcell, and as a list of polytopes enclosing the object in space.

The allowable objects are determined by the capabilities of the robotic system. Their size, weight and geometry are assumed to be such that the robotic system is able to pick, move and place them. These may be any kind of ordered goods, packages, parcels, or other articles that benefit from automated sorting. Each object is associated with unique indicia such as a unique code (e.g., barcode) or a unique destination (e.g., address) of the object.

The manner in which inbound objects arrive may be for example, in one of two configurations: (a) inbound objects arrive piled in bins of heterogeneous objects; or (b) inbound articles arrive by a moving conveyor. The collection of objects includes some that have exposed bar codes and other objects that do not have exposed bar codes. The robotic system is assumed to be able to pick items from the bin or conveyor. The stream of inbound objects is the sequence of objects as they are unloaded either from the bin or the conveyor. With reference to FIG. 5, after an object has been dropped through the object perception unit 26, it is guided by a guide chute 32 onto the routing conveyance system 20.

The manner in which outbound objects are organized is such that objects are placed in a bin, shelf location or container, into which all objects corresponding to a given order are consolidated. These outbound destinations may be arranged in vertical arrays, horizontal arrays, grids, or some other regular or irregular manner, but which arrangement is known to the system. The robotic pick and place system is assumed to be able to place objects into all of the outbound destinations, and the correct outbound destination is determined from unique identifying indicia (identify or destination, such as a bar code or a unique address), which identifies the object or its destination.

It is assumed that the objects are marked in one or more places on their exterior with a visually distinctive mark such as a barcode or radio-frequency identification (RFID) tag so that they may be identified with a scanner. The type of marking depends on the type of scanning system used, but may include 1D or 2D barcode symbologies. Multiple symbologies or labeling approaches may be employed. The types of scanners employed are assumed to be compatible with the marking approach. The marking, either by barcode, RFID tag, or other means, encodes a symbol string, which is typically a string of letters and numbers. The symbol string uniquely associates the object with unique identifying indicia (identity or destination).

The operations of the systems described herein are coordinated by the central control system 100 as shown in FIG. 1. This system determines from symbol strings the unique indicia associated with an object, as well as the outbound destination for the object. The central control system is comprised of one or more workstations or central processing units (CPUs). The correspondence between unique identifying indicia and outbound destinations is maintained by the central control system in a database called a manifest. The central control system maintains the manifest by communicating with a warehouse management system (WMS).

Figure 8:
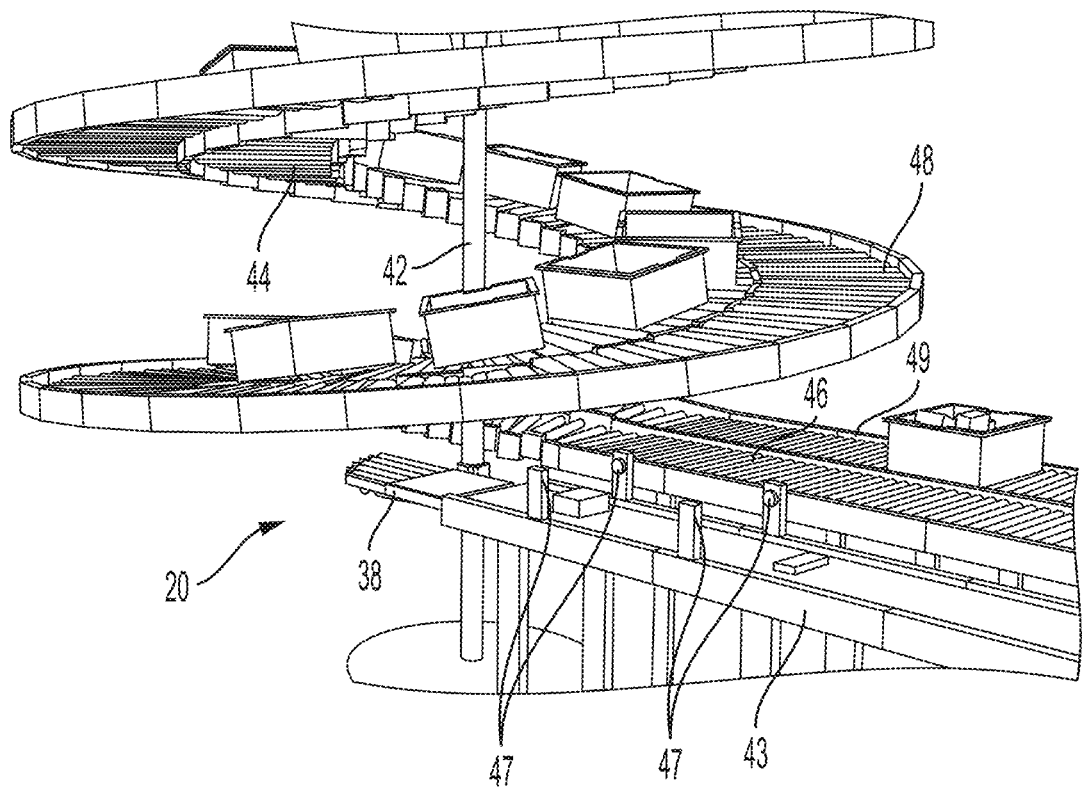
FIG. 8 shows an illustrative diagrammatic view of an object in-feed conveyor leading to a routing conveyor of a helical conveyor system in the system of FIG. 1.
Figure 9:
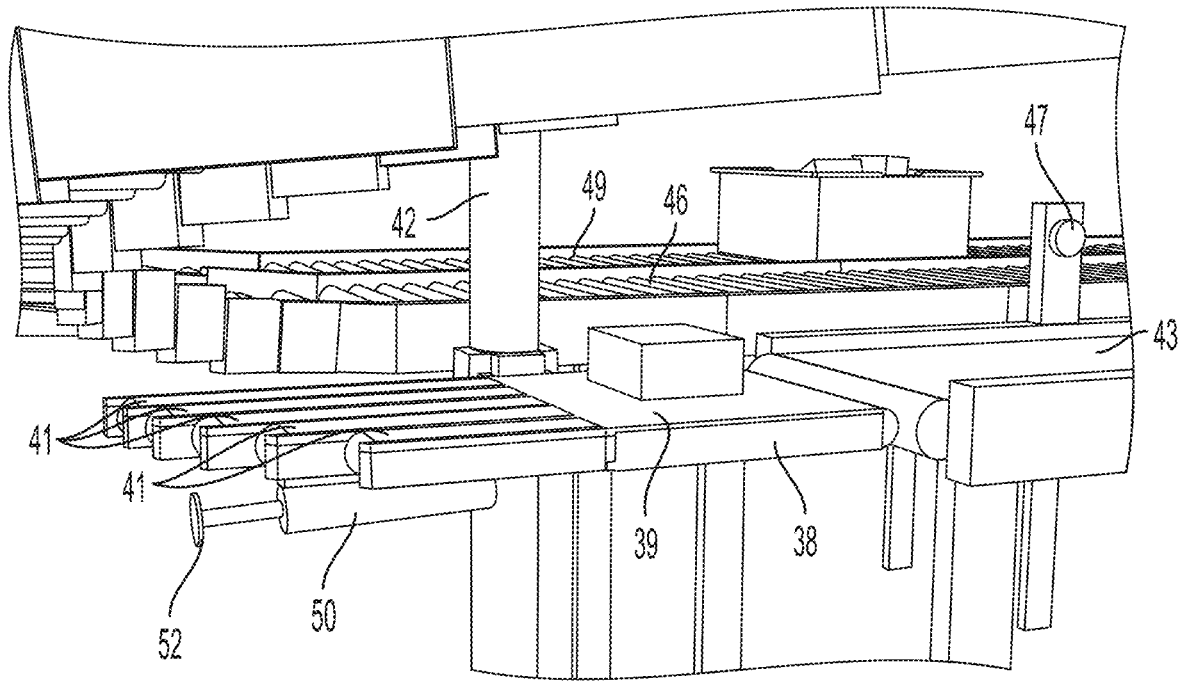
FIG. 9 shows an illustrative diagrammatic view of the routing conveyor of FIGS. 1 and 8 receiving an object.

With reference to FIG. 8 the routing conveyance system 20 receives objects one at a time from the object in-feed conveyor 43, and the object in-feed conveyor 43 may include detectors 47 for monitoring the position of objects on the conveyor, and may be intermittently advanced to provide an object to the routing conveyor unit 38. With reference to FIG. 9 the routing conveyance system 20 also includes a guide pole 42 along which (and around which) the routing conveyor unit 38 may travel, all the while moving just inside the conveyor 44 as further shown in FIG. 10. The routing conveyor unit 38 brings each object to any selected destination container (e.g., a bin, tote, box, etc.) on the conveyor 44 as shown in FIG. 11. The destination containers are thereby provided at destination locations in a generally helical arrangement on the helical conveyor 44.

Figure 10:
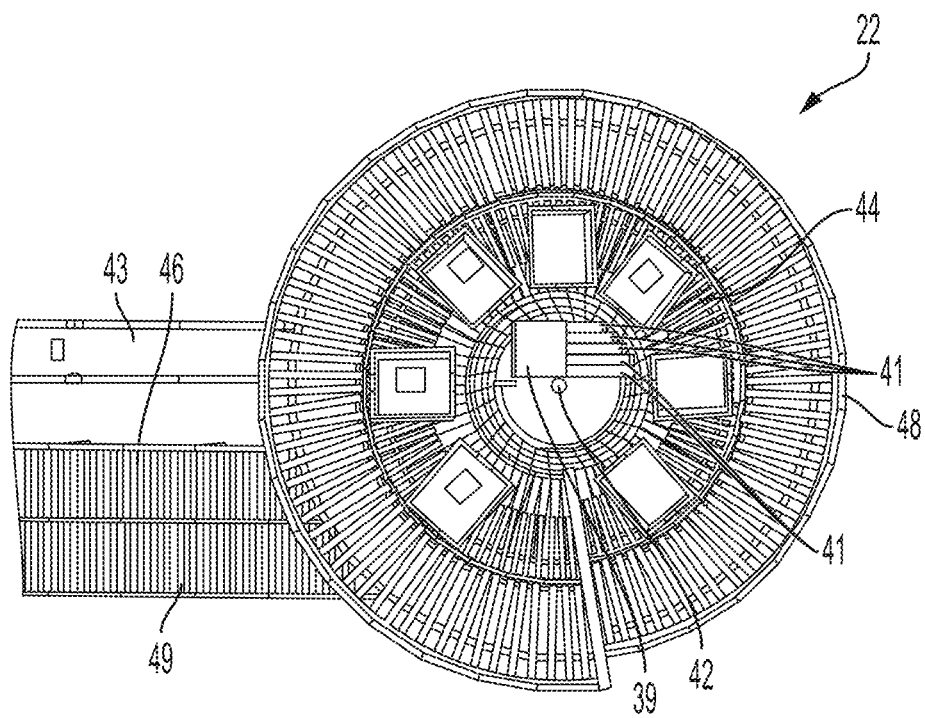
FIG. 10 shows an illustrative diagrammatic plan view of the helical conveyor of FIG. 1 with the routing conveyor being moved upward.
Figure 11:
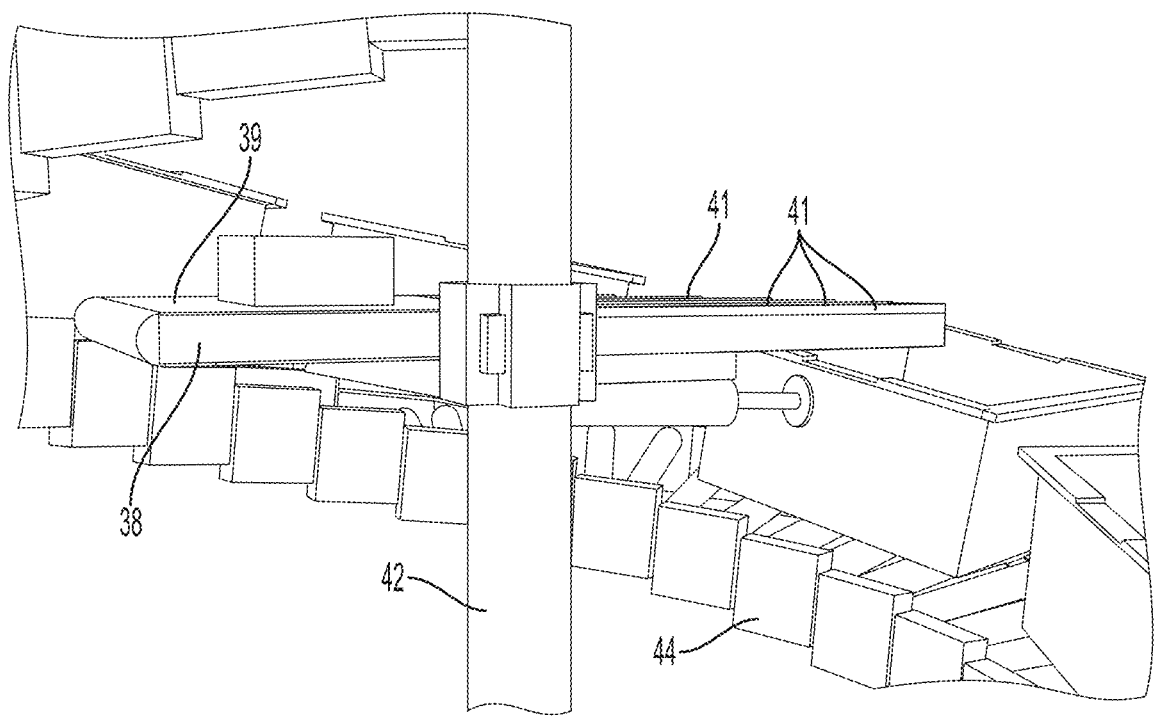
FIG. 11 shows an illustrative diagrammatic side view of the routing conveyor of FIG. 10 rotated to a position at a destination container location.
Figure 12A:
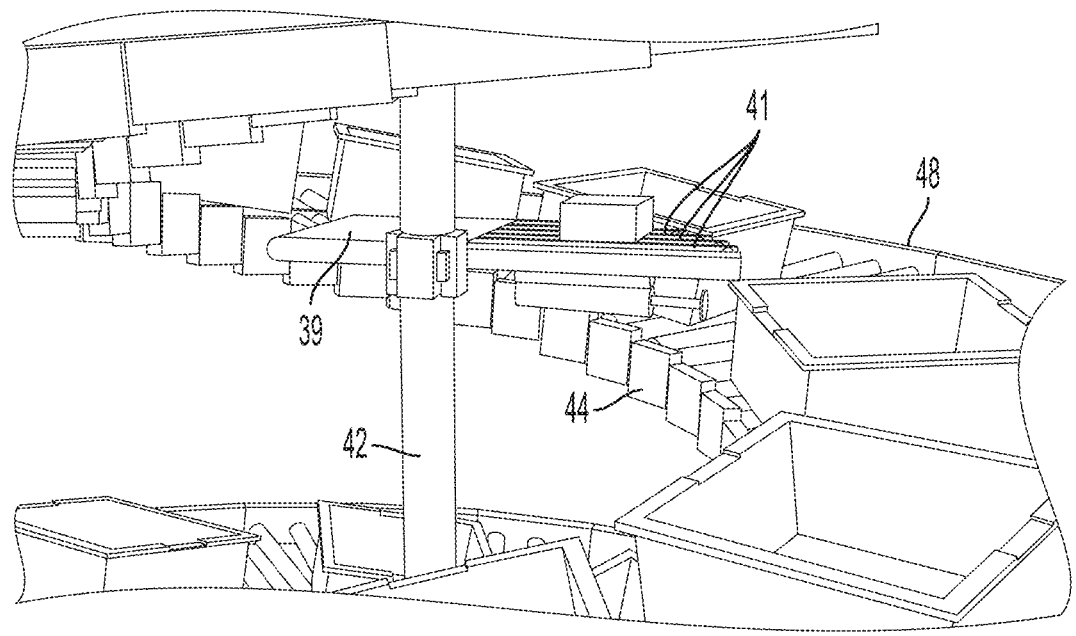
FIGS. 12A and 12B show illustrative diagrammatic side views of the routing conveyor of FIG. 10 with the object moved to a forward end of the routing conveyor (FIG. 12A) and off of the routing conveyor (FIG. 12B) into the destination container.
Figure 12B:
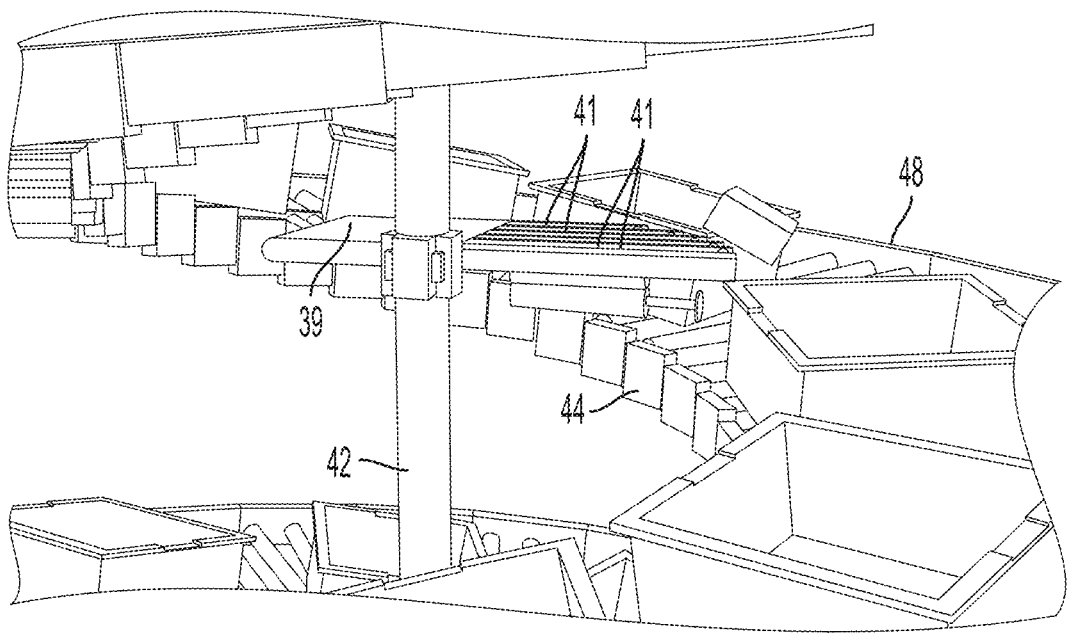

The routing conveyor unit 38 includes a first wide conveyor section 39 as well as a plurality of narrower conveyor sections 41 that permit the unit 38 to move close to the inner wall of the conveyor 44 (as shown in FIGS. 9 and 10). Once the unit 38 is positioned near the selected destination container (FIG. 11), the conveyor section 39 moves the object onto the narrower conveyor sections (as shown in FIG. 12A), which then move the object off of the unit 38 into the selected destination container (as shown in FIG. 12B).

Figure 13A:
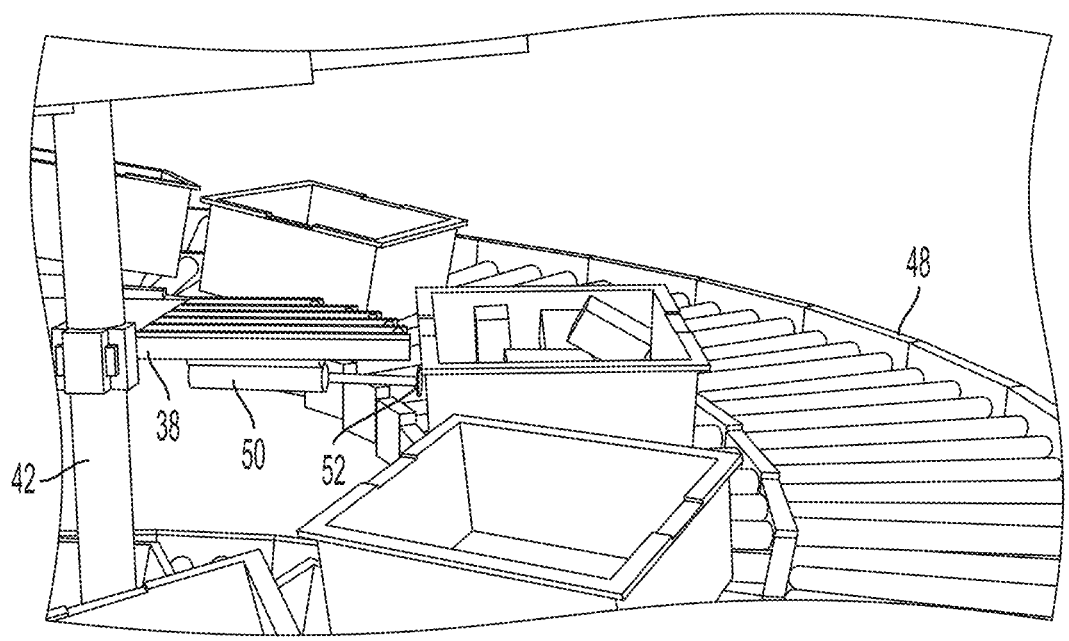
FIGS. 13A and 13B show illustrative diagrammatic side views of the bin removal system of FIGS. 1 and 9 positioned to move completed container (FIG. 13A) and having moved the completed container (FIG. 13B) onto a helical output conveyor.
Figure 13B:
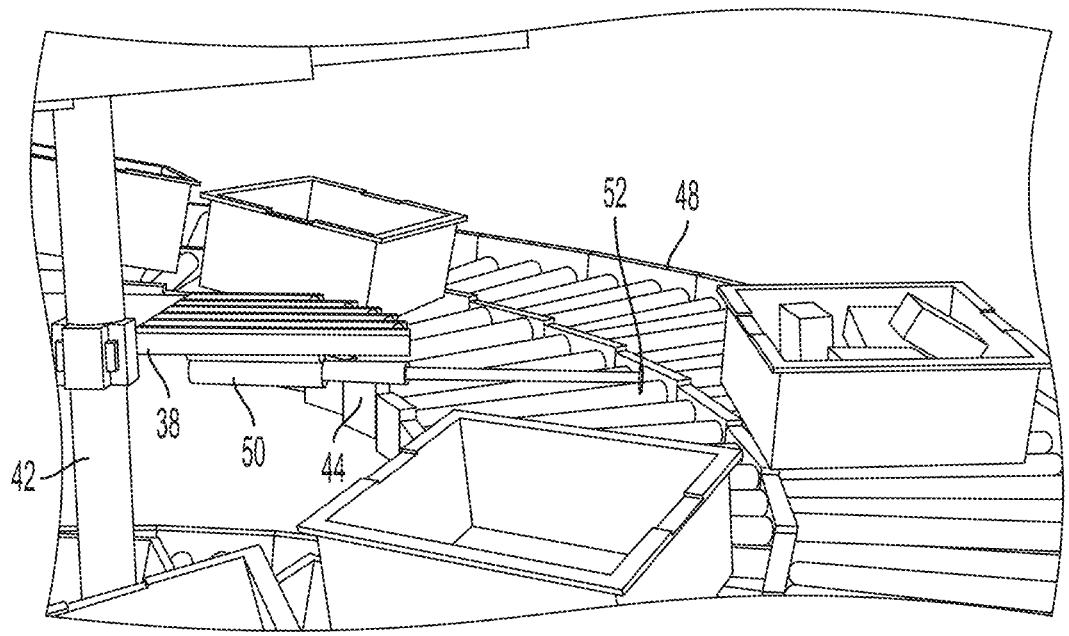
Figure 14:
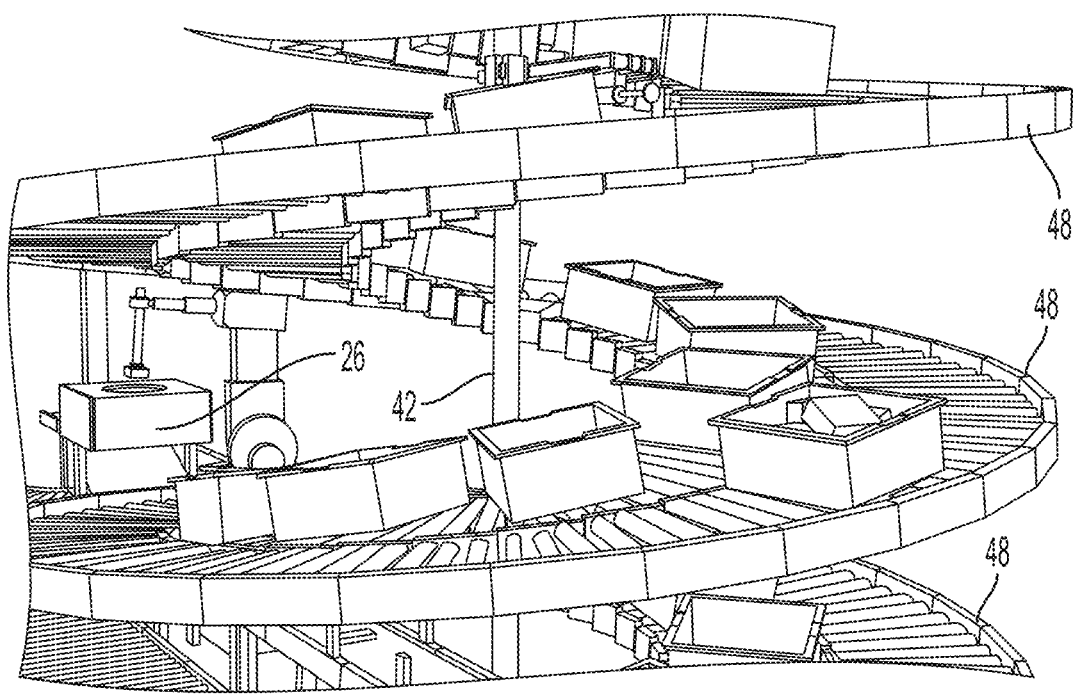
FIG. 14 shows an illustrative diagrammatic view of the helical output conveyor of FIG. 13B with the completed destination container thereon moving toward an output location.

Once a destination container is full or otherwise finished being processed, the container is moved from the conveyor 44 onto the outer output helical conveyor 48. FIG. 13A shows a container removal system 50 with a push plate 52 (e.g., coupled to the underside of the unit 38), that may be positioned adjacent a container to be moved from conveyor 44 to conveyor 48. The container removal system 50 may then be actuated to move the container to the outer output conveyor as shown in FIG. 13B. The removed container then freely moves down the outer output conveyor 48 (e.g., by gravity) as shown in FIG. 14, joining other completed containers on the output station conveyor 49 (as also shown in FIG. 16).

The system therefore, provides destination container locations at generally helically distributed locations such that they may be loaded from a region generally central to the defined helix, and containers may be unloaded in a generally radially outward direction onto a helical output conveyor, where they are exited at one (lower) end thereof. The system provides efficiencies at least in floor area by vertically stacking destination containers that may be accessed from a common central region, yet may be individually selectively removed when completed by moving radially outward to a gravity fed output conveyor.

Figure 15:
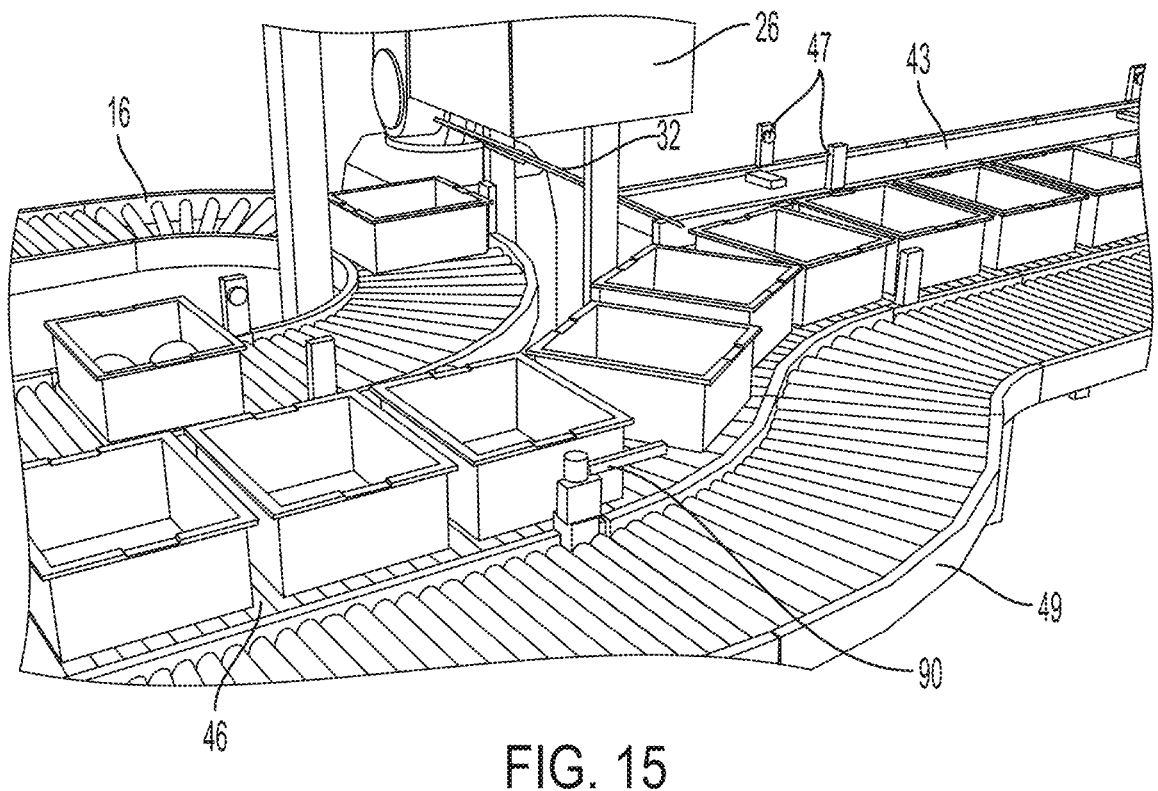
FIG. 15 shows an illustrative diagrammatic view of empty destination containers being loaded into the system of FIG. 1.
Figure 16:
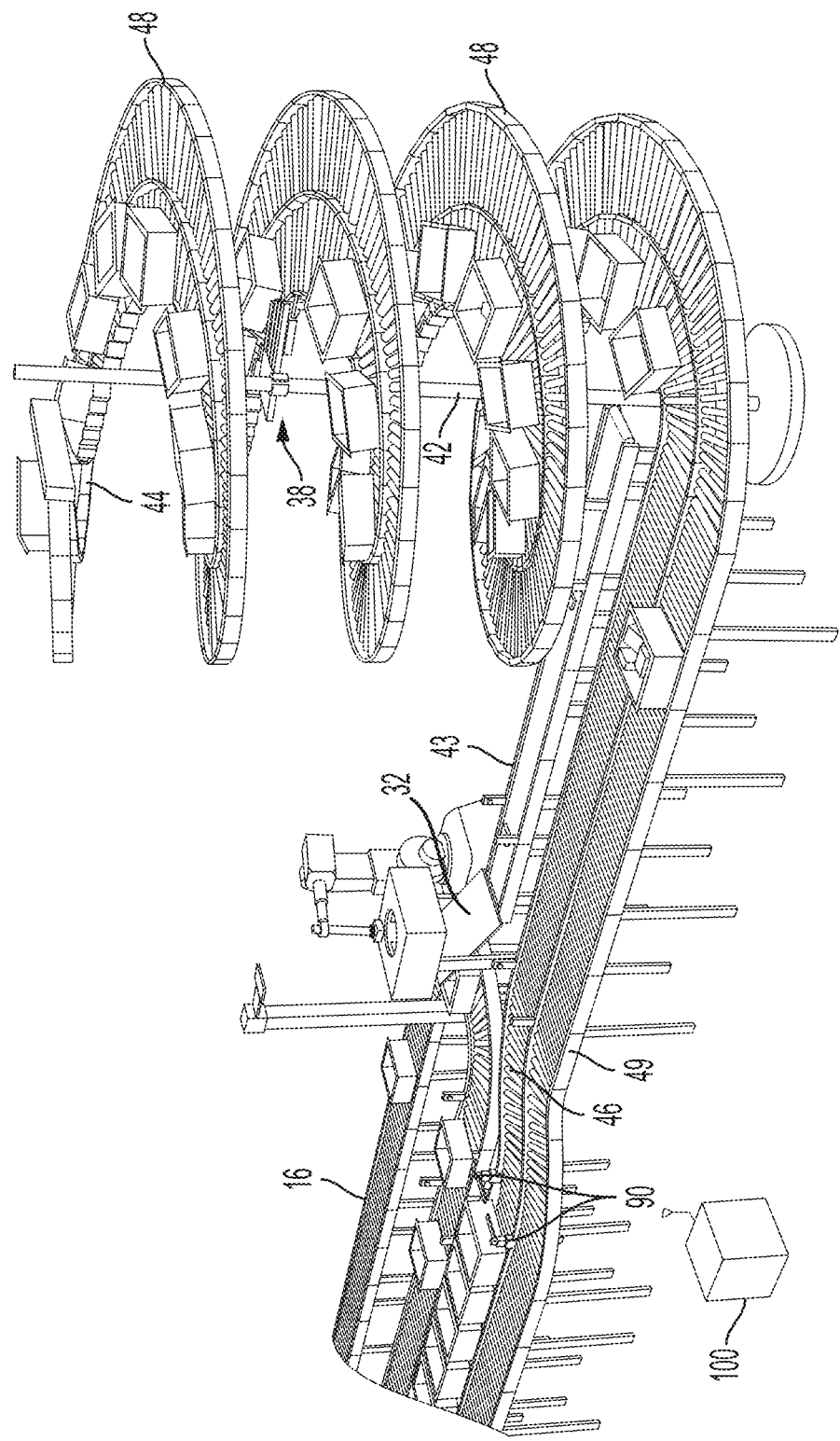
FIG. 16 shows an illustrative diagrammatic opposite end view of the system of FIG. 1.

The containers remaining on the conveyor 44 may be brought together to fill the opening left by the removed container, and one or more empty containers may be brought up onto the helical conveyor 44 by opening gates 90 on an empty container supply conveyor 46 (shown in FIGS. 15 and 16). The rollers on the conveyor sections 44, 48 may be actively powered and coated with a friction providing surface such as urethane, polyurethane, vinyl, rubber, etc., and each conveyor 44, 48 may include a plurality of sensors for monitoring the location of each container on the conveyors 44, 48, Again, the system may operate using one or more computer processing system, and sensors may be used throughout the conveyors to monitor positioning and location of the containers.

Those skilled in the art will appreciate that numerous modifications and variations may be made to the above disclosed embodiments without departing from the spirit and scope of the present invention.

What is claimed is:

1. A storage, retrieval and processing system for processing objects, said storage, retrieval and processing system comprising:
    a plurality of bins including objects to be distributed, said plurality of bins being provided on an input conveyance system;
    a programmable motion device that includes an end effector for grasping and moving any of the objects from within at least one of the plurality of bins at an input area of the input conveyance system;
    a perception system that includes a plurality of cameras for providing perception data regarding a selected object that is presented to the perception system by the programmable motion device; and
    a routing conveyance system including a routing conveyor unit mounted on a guide pole, wherein the routing conveyor unit receives the selected object and moves the selected object in each of vertical and rotational directions along the guide pole toward a destination container provided on a helical destination location conveyor responsive to the perception data.

2. The storage, retrieval and processing system as claimed in claim 1, wherein the destination container is provided among a plurality of destination containers that are provided on the helical destination location conveyor.

3. The storage, retrieval and processing system as claimed in claim 1, wherein the routing conveyor unit includes a plurality of second conveyor sections that extend from a first conveyor section that is mounted on the guide pole.

4. The storage, retrieval and processing system as claimed in claim 1, further comprising a helically-shaped output conveyor adjacent to the helical destination location conveyor, wherein the routing conveyor unit includes a push plate for pushing completed destination containers from the helical destination location conveyor onto the helically-shaped output conveyor.

5. The storage, retrieval and processing system as claimed in claim 4, wherein the helically-shaped output conveyor moves the completed destination containers toward an output station conveyor.

6. The storage, retrieval and processing system as claimed in claim 4, wherein the helical destination location conveyor is positioned radially inwardly of the helically-shaped output conveyor for removing the completed destination containers.

7. A storage, retrieval and processing system for processing objects, said storage, retrieval and processing system comprising:
    a plurality of bins including objects to be distributed, said plurality of bins being provided on an input conveyance system;
    a routing conveyance system including a routing conveyor unit mounted on a guide pole; and
    a programmable motion device that includes an end effector for grasping and moving any of the objects from within at least one of the plurality of bins to an input area of the input conveyance system,
    wherein the routing conveyor unit receives a selected object from the programmable motion device and moves the selected object vertically along the guide pole toward a destination container provided on a helical destination location conveyor.

8. The storage, retrieval and processing system as claimed in claim 7, wherein the destination container is provided among a plurality of destination containers that are provided on the helical destination location conveyor.

9. The storage, retrieval and processing system as claimed in claim 7, wherein the routing conveyor unit is rotationally movable around the guide pole.

10. The storage, retrieval and processing system as claimed in claim 7, wherein the routing conveyor unit includes a plurality of second conveyor sections that extend from a first conveyor section that is mounted on the guide pole.

11. The storage, retrieval and processing system as claimed in claim 7, further comprising a helically-shaped output conveyor adjacent to the helical destination location conveyor, wherein the routing conveyor unit includes a push plate for pushing completed destination containers from the helical destination location conveyor onto the helically-shaped output conveyor.

12. The storage, retrieval and processing system as claimed in claim 11, wherein the helical destination location conveyor is positioned radially inwardly of the helically-shaped output conveyor for removing the completed destination containers.

13. The storage, retrieval and processing system as claimed in claim 12, wherein the helically-shaped output conveyor moves the completed destination containers toward an output station conveyor.

14. A method of providing storage, retrieval and processing of objects, said method comprising:
    providing on an input conveyance system a plurality of bins including objects to be distributed;
    grasping and moving a selected object from within at least one of the plurality of bins in an input area of the input conveyance system using an end effector of a programmable motion device;
    providing perception data by an object perception unit regarding the selected object that is presented to the object perception unit by the programmable motion device; and
    routing the selected object by a routing conveyor unit mounted on a guide pole toward a destination container responsive to the perception data, said destination container being provided among a plurality of destination containers on a helical destination location conveyor, wherein routing the selected object by the routing conveyor unit includes moving the routing conveyor unit along the guide pole in a vertical direction.

15. The method as claimed in claim 14, wherein routing the selected object by the routing conveyor unit further includes rotating the routing conveyor unit around the guide pole.

16. The method as claimed in claim 14, wherein the method further includes removing completed destination containers using a helically-shaped output conveyor for moving completed destination containers toward an output station conveyor.

17. The method as claimed in claim 16, wherein the helical destination location conveyor is positioned radially inwardly of the helically-shaped output conveyor for removing the completed destination containers.

18. A storage, retrieval and processing system for processing objects, said storage, retrieval and processing system comprising:
   a plurality of bins including objects to be distributed, said plurality of bins being provided on an input conveyance system;
   a routing conveyance system including a routing conveyor unit mounted on a guide pole; and
   a programmable motion device that includes an end effector for grasping and moving any of the objects from within at least one of the plurality of bins at an input area of the input conveyance system,
   wherein the routing conveyor unit receives a selected object from the programmable motion device and moves the selected object rotationally around the guide pole toward a destination container provided on a helical destination location conveyor.

19. The storage, retrieval and processing system as claimed in claim 18, wherein the destination container is provided among a plurality of destination containers that are provided on the helical destination location conveyor.

20. The storage, retrieval and processing system as claimed in claim 18, wherein the routing conveyor unit is further movable vertically along the guide pole.

21. The storage, retrieval and processing system as claimed in claim 18, wherein the routing conveyor unit includes a plurality of second conveyor sections that extend from a first conveyor section that is mounted on the guide pole.

22. The storage, retrieval and processing system as claimed in claim 18, further comprising a helically-shaped output conveyor adjacent to the helical destination location conveyor, wherein the routing conveyor unit includes a push plate for pushing completed destination containers from the helical destination location conveyor onto the helically-shaped output conveyor.

23. The storage, retrieval and processing system as claimed in claim 22, wherein the helical destination location conveyor is positioned radially inwardly of the helically-shaped output conveyor for removing the completed destination containers.

24. The storage, retrieval and processing system as claimed in claim 23, wherein the helically-shaped output conveyor moves the completed destination containers toward an output station conveyor.

25. A method of providing storage, retrieval and processing of objects, said method comprising:
   providing on an input conveyance system a plurality of bins including objects to be distributed;
   grasping and moving a selected object from within at least one of the plurality of bins in an input area of the input conveyance system using an end effector of a programmable motion device;
   providing perception data by an object perception unit regarding the selected object that is presented to the object perception unit by the programmable motion device; and
   routing the selected object by a routing conveyor unit mounted on a guide pole toward a destination container responsive to the perception data, said destination container being provided among a plurality of destination containers on a helical destination location conveyor, wherein routing the selected object includes moving the routing conveyor unit around the guide pole in a rotational direction.

26. The method as claimed in claim 25, wherein routing the selected object by the routing conveyor unit further includes moving the routing conveyor unit vertically along the guide pole.

27. The method as claimed in claim 25, wherein the method further includes removing completed destination containers using a helically-shaped output conveyor for moving completed destination containers toward an output station conveyor.

28. The method as claimed in claim 27, wherein the helical destination location conveyor is positioned radially inwardly of the helically-shaped output conveyor for removing the completed destination containers.

\* \* \* \* \*